United States Patent [19]

Hawley

[11] Patent Number: 4,544,716

[45] Date of Patent: Oct. 1, 1985

[54] POLYOLEFIN POLYMERIZATION PROCESS AND CATALYST

[75] Inventor: Gil R. Hawley, Dewey, Okla.

[73] Assignee: Phillips Petroleum Company, Bartlesville, Okla.

[21] Appl. No.: 623,310

[22] Filed: Jun. 22, 1984

[51] Int. Cl.$^4$ .......................... C08F 4/02; C08F 10/06
[52] U.S. Cl. .................................. 526/119; 526/125; 526/351
[58] Field of Search ................................ 526/119, 125

[56] References Cited

U.S. PATENT DOCUMENTS

| | | |
|---|---|---|
| 4,071,672 | 1/1978 | Kashiwa .............................. 526/125 |
| 4,143,223 | 3/1979 | Toyota et al. ....................... 526/125 |
| 4,218,339 | 8/1980 | Zucchini et al. .................... 526/125 |
| 4,234,710 | 11/1980 | Moberly et al. .................... 526/125 |
| 4,296,223 | 10/1981 | Berger ................................. 526/125 |
| 4,315,835 | 2/1982 | Scata et al. ......................... 526/125 |
| 4,363,746 | 12/1982 | Capshew ............................. 526/125 |

*Primary Examiner*—Edward J. Smith
*Attorney, Agent, or Firm*—Edward L. Bowman

[57] ABSTRACT

A catalyst and its method of preparation and use involving reacting a magnesium dihalide, an alkoxytitanium compound and water, followed by reaction with an organoaluminum compound and then with a halide ion exchanging source.

14 Claims, No Drawings

POLYOLEFIN POLYMERIZATION PROCESS AND CATALYST

This application is a divisional of U.S. Pat. No. application Ser. No. 524,615 filed Aug. 19, 1983 now U.S. Pat. No. 4,492,768.

The present invention relates to the polymerization of olefins. In another aspect, this invention relates to novel catalysts useful for the polymerization of olefins.

In U.S. application Ser. No. 240,533, filed Mar. 4, 1981, now U.S. Pat. No. 4,394,291, by the present inventor, there are disclosed a number of new high activity polymerization catalysts. The disclosure of said application is hereby incorporated by reference. One of the catalyst types disclosed was prepared by reacting reactants comprising (a) a magnesium dihalide, (b) an electron donor, and (c) a titanium compound to form a first catalyst component, then reacting that component with a precipitating agent and then reacting the resulting solid product with a halogenating agent, such as, for example, TiCl$_4$.

The present invention is based upon the discovery that for a given magnesium dihalide reactant more active polymerization catalysts can be obtained if the titanium compound and the electron donor are reacted with small amounts of water prior to reaction with the magnesium dihalide.

SUMMARY OF THE INVENTION

The present invention provides an improved catalyst, the method for its production, and the method for its use.

In accordance with the present invention, the catalyst is produced by reacting an alkoxytitanium compound, a phenol, and a small quantity of water in a hydrocarbon liquid, then reacting the resulting solution with a magnesium dihalide having less than 1.5 moles of water associated with each mole of magnesium dihalide to form a first catalyst component solution, then reacting that solution with an organoaluminum halide to form a solid product, and then reacting said solid product with a halogenating agent comprising a titanium halide. The amount of water employed in forming said first catalyst component solution is such that the catalyst is more active than if no water were employed.

DETAILED DESCRIPTION OF THE INVENTION

The benefits provided by the present invention are most noteable when the magnesium dihalide that is employed contains less than 1.5 moles of water per mole of dihalide. More preferably the magnesium dihalide is a commercially available "anhydrous" MgCl$_2$ having less than 1 mole of water per mole of dihalide. The invention is especially useful when making catalysts using magnesium dihalides containing less than 0.1 mole of water per mole of the dihalide. The presently preferred dihalide is magnesium dichloride. The level of water associated with a magnesium dihalide can be determined using routine analysis techniques. Typically, such techniques involve the use of Karl Fischer titration plus other conventional techniques such as X-ray diffraction and elemental analysis for determining whether there are significant amounts of other materials, particularly MgO, associated with the dihalide.

The alkoxytitanium compounds used in the present invention are those in which the titanium is bonded to at least one alkyl radical. The preferred alkoxytitanium compounds are those of the formula

wherein each R is individually selected from an alkyl group containing 1 to 20 carbon atoms and each R can be the same or different. The most preferred are those in which each alkyl group contains 1 to 10 carbon atoms.

The term "phenol" is used herein to refer to substituted as well as unsubstituted phenols. Typical examples include phenol, o-methyl phenol, n-methyl phenol, p-methyl phenol, 4-phenyl phenol, o-fluorophenol, m-fluorophenol, p-fluorophenol, p-sec-butylphenol, p-ethyl phenol, p-isopropyl phenol, p-tert-butyl phenol, p-methoxy phenol, p-cyanophenol, and p-nitrophenol.

The molar ratio of the phenol to the alkoxytitanium compound can be selected over a relatively broad range. Generally the molar ratio of phenol to alkoxytitanium compound is in the range of about 1/1 to about 3/1, preferably about 1.5/1.

Other electron donors can also be employed in making the first catalyst component solution. Typical examples include benzoic acid esters. The term benzoic acid ester is used generally to include substituted as well as unsubstituted benzoic acid esters. Typical examples include ethyl benzoate, ethyl p-methoxybenzoate, ethyl toluate, ethyl p-butoxybenzate, and butyl benzoate. The preferred benzoic acid esters are those having 8 to 12 carbon atoms per molecule.

When an ester and a phenol are employed, typically the sum of the moles of those two electron donors to the moles of the alkoxytitanium compound are in the range of about 5/1 to 1/5, more preferably 3/1 to 2/1.

The alkoxytitanium compound, electron donor, and water are reacted in a hydrocarbon liquid. Typical hydrocarbons include n-pentane, n-heptane, methylcyclohexane, toluene, xylenes, and the like.

Preferably, the alkoxytitanium compound and the phenol are reacted prior to the addition of the water. It is however possible to combine the alkoxytitanium compound, electron donor, and water in any order. The reaction can be carried out over a wide temperature range. Typically the reaction would be conducted at some temperature between about 20° C. and the boiling temperature of the hydrocarbon liquid, more generally at a temperature in the range of about 30° C. to about 110° C.

The same temperature range can be employed for reacting the magnesium dihalide and the resulting solution.

The amount of water to be employed will vary depending upon the amount of water associated with the magnesium dihalide and the extent of improvement desired. Typically, the molar ratio of water added in making the first catalyst component solution to the titanium compound is in the range of about 0.5/1 to about 6/1, more preferably in the range of about 1/1 to about 5/1.

The precipitating agent is an organoaluminum halide. Typical examples include those compounds having the formula AlR$_n$X$_{3-n}$ wherein each R is individually selected from saturated and unsaturated hydrocarbyl radicals containing 1 to 20 carbon atoms per radical, X is a halogen and n is any number such that $1 \leq n \leq 2$. Typical examples include ethylaluminum dichloride, diethylaluminum chloride, ethylaluminum sesquichloride and others set forth in the aforementioned U.S. application Ser. No. 240,533. It is currently most preferred to use a precipitating agent comprising ethyl aluminum sesquichloride.

It is also within the scope of the present invention to precipitate the catalyst component in the presence of a small particle size support such as silica gel and the like.

The reaction of the organoaluminum halide with the first catalyst component can be carried out by merely adding the organoaluminum halide to a solution of the first component. It is, however, currently preferred to add a hydrocarbon solution of the halide to the first component solution.

The temperature employed for reacting the second catalyst component, i.e., the organoaluminum halide, and the first catalyst component can be selected over a broad range. Generally, the temperature employed is within a range of about 0° C. to about 50° C. or higher, while temperatures within the range of 20° C. to about 30° C. were most often employed. Since heat is evolved when the first catalyst component and the second catalyst component are mixed, the mixing rate is adjusted as required and additional cooling is employed in order to maintain a relatively constant mixing temperature. It is noted with respect to mixing the first and second components that the order of addition is not important and either component can be added to the other. After completing the mixing, the resulting slurry is stirred or agitated for a sufficient time, generally within a range of about 15 minutes to about 5 hours to insure that mixing of the components is complete. Thereafter, stirring is discontinued and the solid product recovered by filtration, decantation, and the like. The product is then washed with a suitable material such as a hydrocarbon, e.g., n-pentane, n-heptane, cyclohexane, benzene, xylenes and the like, to remove any soluble material which may be present. The product is then dried and stored under dry nitrogen.

The molar ratio of the transition metal compound of the first catalyst component to the second catalyst component can be selected over a relatively broad range. Generally, the molar ratio of the transition metal of the first catalyst component to the second catalyst component is within a range of from about 10:1 to about 1:10 and more generally within a range of about 2:1 to about 1:3 since a molar ratio within the latter range usually produces a catalyst which can be employed as an especially active olefin polymerization catalyst.

Generally, the reaction between solid product resulting from the reaction of the first and second components with the halide ion exchanging source can be carried out neat or in a liquid medium in which the halide ion exchanging source is soluble. The product from step (2) is generally in a liquid diluent when contacted with the halide ion exchanging source. Any suitable diluent can be employed. Examples include normally liquid hydrocarbon such as n-pentane, n-heptane, cyclohexane, benzene, and xylene.

The temperature employed in step (3) can be selected over a relatively broad range, generally in the range of −25° C. to +250° C., preferably 0° C. to 200° C., with temperatures of 100° C. being most preferred.

The treating time can also be selected over a broad range and generally is within the range of about 10 minutes to about 10 hours. While the weight ratio of the halide ion exchanging source to the product of step (2) can be selected over a relatively broad range, the weight ratio of the halide ion exchanging source to the product of step (2) is generally within a range of about 10:1 to about 1:10 and more generally from about 7:1 to about 1:4. Following the treatment of the product of step (2) with the halide ion exchanging source the surplus halide ion exchanging source is removed by washing the solid catalyst with a dry (essential absence of water) liquid such as a hydrocarbon of the type previously disclosed, n-hexane, or xylene for example. The resulting catalyst, after drying, is stored under dry nitrogen.

The currently preferred titanium halide for use as the halide ion exchanging source is $TiCl_4$. In an especially preferred embodiment, the $TiCl_4$ is employed in conjunction with a halide of silicon such as $HSiCl_3$ or $SiCl_4$. Preferably the molar ratios of $TiCl_4/HSiCl_3/SiCl_4$ is in the range of about 2.5/2/1 to 4/3.5/1. Generally the $HSiCl_3$ and $SiCl_4$ are used in such amounts that their combined volumes equal the volume of the $TiCl_4$.

The catalyst of the present invention can be used in the polymerization of olefins. Olefins which can be homopolymerized or copolymerized with the invention catalysts include aliphatic mono-1-olefins. While the invention would appear to be suitable for use with any aliphatic mono-1-olefin, those olefins having 2 to 18 carbon atoms are most often used. The mono-1-olefins can be polymerized according to the present invention employing either a particle form process, a gas phase process, or a solution form process. Aliphatic mono-1-olefins can be copolymerized with other 1-olefins and/or with other smaller amounts of other ethylenically unsaturated monomers, such as 1,3-butadiene, isoprene, 1,3-pentadiene, styrene, alpha-methylstyrene, and similar ethylenically unsaturated monomers which do not impair the catalyst.

The catalysts of this invention can also be utilized to prepare homopolymers and copolymers of conjugated diolefins. Generally the conjugated diolefins contain 4 to 8 carbon atoms per molecule. Examples of suitable conjugated diolefins include 1,3-butadiene, isoprene, 2-methyl-1,3-butadiene, 1,3-pentadiene, and 1,3-octadiene. Suitable comonomers, besides the conjugated diolefins listed above include mono-1-olefins previously described and vinylaromatic compounds generally. Some suitable vinylaromatic compounds are those having from about 8 to about 14 carbon atoms per molecule, and include for example styrene and various alkylstyrenes, such as 4-ethylstyrene and such as 1-vinylnaphthalene.

The weight percent of the conjugated diolefin in the copolymerization mixture can be selected over a relatively broad range. Generally the weight percent of the conjugated diolefin is from about 10 to about 95 weight percent and the other comonomers are from about 90 to about 5 weight percent. However, the weight percent of the conjugated diolefin is preferably from about 50 to about 90 weight percent and the other comonomers are from about 50 to about 10 weight percent.

The inventive catalysts are particularly well suited for producing stereoregular polypropylene, many offering potential for high rates as well as low soluble polymer formation.

Polymerization may be conducted in a liquid phase, in the presence or absence of an inert hydrocarbon diluent, or in a gas phase. In the polymerization of propylene, particularly satisfactory results have been attained operating in the presence of an aliphatic or aromatic hydrocarbon diluent, liquid under the polymerization conditions, such as propylene, toluene, gasoline, and the like.

While it may not be necessary in all instances to employ a cocatalyst with the catalyst of the present invention, the use of cocatalysts is recommended for best results. The organometallic cocatalysts suitable for use in accordance with the invention can be selected from among the hydrides and organometallic compounds of metals of Groups IA, II, and IIIA of the Periodic Table. Of the organometallic cocatalysts, organoaluminum compounds such as those described above as suitable for use as the second component of the catalyst, are preferred with the most preferred organoaluminum cocatalysts being compounds of the formula $R_3Al$ which include, or example, trimethylaluminum, triethylaluminum, triisopropylaluminum, tridecylaluminum, trieicosylaluminum, tricyclohexylaluminum, triphenylaluminum, 2-methylpentyldiethylaluminum, and triisoprenylaluminum. Triethylaluminum is preferred since this compound produced excellent results in the runs hereafter described.

The molar ratio of the organometallic compound of the cocatalyst to the transition metal compound of the first catalyst component is not particularly critical and can be selected over a relatively broad range. Generally, the molar ratio of the organometallic compound of the cocatalyst to the transition metal compound of the first catalyst component is within a range of about 1:1 to about 1500:1. For catalyst systems wherein the cocatalyst comprises at least one organoaluminum compound typically there is employed about 0.25 to 15 milligrams of the titanium-containing component per mmole of organoaluminum cocatalyst.

The catalyst is preferably used with a multicomponent cocatalyst system comprising triethylaluminum (TEA), an aromatic ester such as ethyl anisate (EA), ethyl benzoate (EB), methyl-p-toluate (MPT), etc., and diethylaluminum chloride. Best selectivity (stereospecificity) is obtained when the TEA:ester mole ratio is about 2:1. The DEAC, when used, helps in increasing activity. Generally, a TEA:ester:DEAC mole ratio ranging from about 2:1:0.5–3 and more preferably about 2/1/2. If it is desired to dispense with using DEAC, higher ratios of TEA must be used, i.e., TEA to ester molar ratios of 3/1 to 5/1. Under such conditions it is generally preferred to use MPT rather than EB.

The polymerization process according to the present invention employing the catalysts and cocatalysts as above described can be performed either batchwise or continuously. In a batch process, for example, a stirred autoclave is prepared by first purging with nitrogen and then with a suitable compound, such as isobutane for example. When the catalyst and cocatalyst are employed either can be charged to the reactor first or they can be charged simultaneously through an entry port under an isobutane purge. After closing the entry port, hydrogen, if used, is added, and then a diluent such as isobutane is added to the reactor. The reactor is heated to the desired reaction temperature, which for polymerizing ethylene, for example, is, for best results, generally within a range of about 50° C. to about 120° C. and the monomer is then admitted and maintained at a partial pressure within a range of about 0.5 MPa to about 5.0 MPa (70–725 psig) for best results. At the end of the designated reaction period, the polymerization reaction is terminated and the unreacted olefin and isobutane are vented. The reactor is opened and the polymer, such as polyethylene, is collected as a free-flowing white solid and is dried to obtain the product.

In a continuous process, for example, a suitable reactor such as a loop reactor is continuously charged with suitable quantities of solvent or diluent, catalyst, cocatalyst, polymerizable compounds and hydrogen, if any, and in any desirable order. The reactor product is continuously withdrawn and the polymer recovered as appropriate, generally by flashing the diluent (solvent) and unreacted monomers and drying the resulting polymer.

For optimum productivity of polymer of low solubility in the continuous polymerization of propylene preferably the cocatalyst comprising the trialkylaluminum-electron donor is contacted with the titanium-containing catalyst prior to being exposed to liquid propylene.

The olefin polymers made with the catalysts of this invention are useful in preparing articles by conventional polyolefin processing techniques such as injection molding, rotational molding, extrusion of film, and the like.

A further understanding of the present invention and its advantages will be provided by the following examples.

EXAMPLE I

Invention catalyst A. In an argon filled dry box, a quart (0.9 L) glass beverage bottle containing a magnetic stirring bar was charged with 300 mL of dry xylenes, 25 g (0.15 mole) of 4-phenylphenol (4-PP) and 35.8 mL (0.105 mole) of titanium tetra-n-butoxide [$Ti(OBu)_4$]. A pale red solution resulted, possibly containing $Ti(OBu)_3$(4-PP) and n-butanol. After about 10 minutes with stirring, 3.6 mL (0.2 mole) of water was added dropwise (mole ratio of $H_2O$:Ti of 2:1) and the color of the solution turned dark red. A small amount of solid (possibly small water droplets) appeared. The mixture was then heated for 1 hour at 100° C. with no apparent change in appearance. To the reaction product solution was then added 19.8 g of $MgCl_2.0.03H_2O$, which corresponds to about 19.7 (0.21 mole) of anhydrous $MgCl_2$. The mixture was heated for 1 hour at 100° C. resulting in a deep red solution containing some solid matter. The solution was cooled to about 25° C. and 125 mL (0.39 mole) of a 25 weight percent solution of ethylaluminum sesquichloride (EASC) in n-heptane was added dropwise resulting in a dark solution containing an orange solid. The orange solid was recovered by centrifugation, slurried in n-hexane followed by centrifugation, and repeated as necessary until the supernatant liquid was colorless or nearly so. The product was dried by standing overnight in the dry box, yielding 47.1 g of an orange solid. 20.0 g of the part 1 product above was reacted in a dry box with a sufficient amount of a mixture produced from 360 mL (621 g, 3.28 mole) of $TiCl_4$, 270 mL (362 g, 2.68 moles) of $HSiCl_3$ and 90 mL (135g, 1.19 moles) of $SiCl_4$ to produce a readily stirrable mixture (about 100 mL) for 1 hour at 100° C. The above activating mixture (halide exchange agent) on a weight percent (mole %) basis constituted 56 weight % (46 mole %) of $TiCl_4$, 32 weight % (37 mole %) of $HSiCl_3$ and 12 weight % (17 mole %) of $SiCl_4$. The reaction product (part II product, the catalyst) was isolated by vacuum filtration, washed with n-hexane until the filtrate was colorless and dried by standing overnight in the glove box, yielding 12.3 g of a particulate, purple solid.

A 6.5 mg portion of the catalyst was tested for propylene polymerization in a 40 minute run at 70° C., 10 psi hydrogen, cocatalyst system consisting of 2.0 mmoles TEA plus 1.1 mmoles EA and 2.0 mmoles DEAC by employing the process described before. The following results were found.

Total productivity (reactor polymer plus propylene soluble polymer) is calculated to be 17,100 g polymer per g solid catalyst per 40 minutes. Assuming a linear catalyst activity response, the calculated productivity for 60 minutes is about 25,600 g polymer per g catalyst. The calculated productivity of propylene insoluble polymer is determined to be 16,900 g polymer per g solid catalyst per 40 minutes or 25,300 g polymer per g solid catalyst per hour. The bulk density of the reactor recovered polymer is 0.372 g/cc. The propylene soluble polymer amounts to 1.5 weight percent and xylene-soluble polymer is determined to be 3.5 weight percent to give total solubles produced of 5.0 weight percent.

The results obtained indicate that a very active propylene polymerization catalyst has been produced. The catalyst is one which yields relatively low total solubles of about 5 weight percent as by-product material. The bulk density of the polymer, 0.372 g/cc (23.2 lbs/cubic foot), is sufficiently high to be conventionally handled in processing equipment.

EXAMPLE II

Invention catalyst B. In 300 mL of xylene contained in a quart beverage bottle were mixed 0.15 mole of 4-PP, 0.105 mole of $Ti(OBu)_4$, 0.2 mole of $H_2O$ and 7.5 mL (0.053 mole) of ethyl benzoate (EB). The mixture was stirred ½ hour at about 25° C. and then 19.8 g from the same $MgCl_2$ source used previously (0.21 mole) was added and the mixture was heated for 1 hour at 100° C. The cooled product was reacted with 125 mL (0.39 mole) of the EASC solution referred to before and the solids were isolated, washed and dried in the manner described for catalyst A yielding 27.0 g of a burnt orange product. 20.0 g of the part 1 product was reacted with the $TiCl_4$—$HSiCl_3$—$SiCl_4$ mixture as before. The product was isolated and dried as before yielding 17.8 g of particulate purple solid.

A 5.0 mg portion of the catalyst was tested for propylene polymerization at 70° C. for 1 hour using 10 psi hydrogen and the cocatalyst system of Example I. The following results were obtained.

Total productivity is calculated to be 15,500 g polymer per g solid catalyst per hour and calculated productivity of propylene insoluble polymer is 15,100 g polymer per g solid catalyst. The bulk density of the reactor recovered polymer is 0.361 g/cc (22.5 lbs/ft³). The propylene soluble polymer formed amounts to 2.6 weight percent, the xylene-soluble polymer is determined to be 2.7 weight percent to give total solubles produced of 5.3 weight percent.

The results obtained once again reveal that an active, stereospecific catalyst for propylene polymerization is made. The catalyst is somewhat less active than that of Example I which may be attributal to the presence of EB in catalyst preparation.

EXAMPLE III

Invention catalysts C, D, E, F.

The catalysts were prepared by separately charging quart bottles with 300 mL of xylene, 0.105 mole of $Ti(OBu)_4$, 0.2 mole of water and the indicated phenol following. Catalyst C was made in the presence of 17.0 g (0.10 mole) of 4-PP, catalyst D was made in the presence of 9.8 g (0.10 mole) of phenol, catalyst E was prepared in the presence of 10.8 g (0.10 mole) of p-cresol and catalyst F was made in the presence of 15.0 g (0.10 mole) of p-sec-butylphenol. Each mixture was stirred ½ hour at 25° C., 0.053 mole of EB was added to each bottle and the mixture stirred for ½ hour more. Then 19.8 g of $MgCl_2$ (0.21 mole) from the same previous source was added to each mixture and the mixtures were then heated for 1 hour at 100° C. Each cooled product was reacted with 125 mL (0.39 mole) of the EASC solution and the resulting precipitates were isolated, washed and dried as before yielding 46.4 g of a red-brown solid for the part 1 product of catalyst C, 55.0 g of a yellow solid for part 1 product of catalyst D and 35.4 each of a dark yellow solid for the part 1 products of catlaysts E and F. 20.0 g of each part 1 product was reacted with a sufficient quanitity of the $TiCl_4$—$HSiCl$—$SiCl_4$ mixture as before with each product isolated, washed and dried as before yielding 14.9 g of a purple solid as catalyst C, 12.0 g of a burnt orange solid as catalyst D, 17.7 g of a red-brown solid as catalyst E and 17.5 g of a burnt orange solid as catalyst F.

A portion of each catalyst was tested in propylene polymerization for 1 hour at 70° C. as described in Example II. The results are set forth in Table I.

TABLE I

| | | | | Propylene Polymerization | | | | |
| | | | | Calculated Productivity g/g/hr | | | | |
| Run | | Catalyst | | Total | Propylene | Bulk Density | Solubles, Wt % | | |
| No. | Phenol | No. | Wt. mg | Polymer | Insoluble Polymer | g/cc | Propylene | Xylene | Total |
| 1 | 4-pp | C | 6.4 | 8370 | 8090 | 0.346 | 3.3 | 3.1 | 6.4 |
| 2 | Phenol | D | 11.5 | 8560 | 8460 | 0.420 | 1.1 | 3.7 | 4.8 |
| 3 | Cresol | E | 6.9 | 4480 | 4230 | — | 5.6 | 3.4 | 9.0 |
| 4 | $C_4$—Phenol | F | 9.5 | 3440 | 3280 | — | 4.6 | 2.9 | 7.5 |

Inspection of the data in Table I shows that active propylene polymerization catalysts are made in each instance with a phenol as one component. The most active and stereospecific catalysts are made, however, when the phenol is phenol itself, run 2, or 4-phenylphenol, run 1. The bulk density data of 0.346 g/cc (21.6 lbs/ft³) in run 1 and 0.420 g/cc (26.2 lbs/ft³) in run 2 indicate that conventionally processable polymer is produced with the most active catalysts.

EXAMPLE IV

Invention catalyst G.

A quart beverage bottle was charged with 6.75 g (0.020 mole) of $Ti(OBu)_4$, 3.4 g (0.020 mole) of 4-PP and 300 mL of xylene containing 0.7 mL (0.039 mole) of water. The mixture was stirred ½ hour at 25° C. and to it was added 3.8 g of $MgCl_2$ containing 1.5 weight percent water to give the equivalent of 3.7 g (0.039 mole) anhydrous $MgCl_2$ and 0.057 g (0.003 mole $H_2O$ or $MgCl_2.0.08H_2O$. The mixture was heated with stirring at 100° C. for 45 minutes, 1.5 mL (0.011 mole) of EB was added and the mixture was heated an additional 15 minutes. At this point, 26.0 g of Davison grade 952 silica which had been previously calcined at 800° C. in air was added and the mixture was stirred for 10 minutes. The reaction mixture was cooled to about 25° C. and reacted with 25 mL (0.078 mole) of the EASC solution as before. The product was isolated, washed and dried as before to yield 35.9 g of a red-brown silica-supported part I product. Since 26 g of the product consisted of silica, the active portion of the part I product comprises 35.9−26.0=9.9 g corresponding to about 27 weight percent. 20.0 g of the product was reacted with the $TiCl_4$—$HSiCl_3$—$SiCl_4$ mixture as before. The product was isolated, washed and dried as before yielding 20.95 g of a silica-supported purple solid as the catalyst. A 56.7 mg portion of the catalyst was tested in propylene polymerization for 1 hour at 70° C. as described in Example II. The following results were found.

Total productivity is calculated to be 1650 g polymer per g solid supported catalyst per hour and calculated productivity of propylene insoluble polymer is 1610 g polymer per g solid catalyst. Assuming the supported catalyst contains 27 weight percent catalytically active component, the corresponding productivities of total polymer and propylene-insoluble polymer are calculated to be 6580 g polymer and 6440 g polymer, respectively. Since the bulk density of reactor recovered polymer is only 0.236 g/cc (14.7 lbs/ft$^3$) processing on a commercial scale might present some problems. Xylene soluble polymer 3 wt %, propylene soluble polymer is 2.2 wt %, total solubles is 5.2 wt %.

EXAMPLE V

A series of catalysts was prepared by employing 8 quart beverage bottles, each bottle individually charged with the particular components used for that catalyst. Each bottle was charged with 300 mL of xylene, 0.15 mole of 4-PP and 0.105 mole of Ti(OBu)$_4$. Each mixture was stirred 10 minutes at room temperature, a specified amount of water was added dropwise and the mixtures were heated for 1 hour at 100° C. Each bottle was charged with the amount of water set forth in Table IIA.

TABLE IIA

| Sample No. | Water mL | Water moles | Moles H$_2$O mole Ti | Comments |
|---|---|---|---|---|
| 1 | 1.8 | 0.1 | 1.0 | very dark solution |
| 2 | 3.6 | 0.2 | 2.0 | very dark solution |
| 3 | 5.4 | 0.3 | 3.0 | red-brown, thickened |
| 4 | 6.3 | 0.35 | 3.5 | red-brown, thickened |
| 5 | 7.2 | 0.4 | 4.0 | very thick mixture, needed additional xylene to form |
| 6 | 8.1 | 0.45 | 4.5 | |
| 7 | 9.0 | 0.5 | 5.0 | |
| 8 | 10.8 | 0.6 | 6.0 | stirrable mixture |

The pressure was vented off the samples and 19.8 g MgCl$_2$.0.03H$_2$O (same as in Example I) which corresponds to about 19.7 g (0.21 mole) of MgCl$_2$ was added to each. The samples were treated for 30 minutes at 100° C., 0.053 mole EB added to each, the mixtures heated an additional 30 minutes at 100° C. and cooled to about 30° C. Each sample was diluted with about 300–500 mL xylene so it could be readily stirred and to each sample was added 125 mL (0.39 mole) of the EASC solution and the resulting precipitates were isolated, washed and dried as before yielding the part I products. 10.0 g of each part I product was treated with the $TiCl_4$—$HSiCl_3$—$SiCl_4$ mixture, isolated, washed and dried as before to obtain the catalysts. The results are presented in Table IIB.

TABLE IIB

Part I, II Catalyst Description

| Sample No. | Part I, Solid Color | Yield g | Part II Solid (catalyst) Color | yield g | yield Wt % |
|---|---|---|---|---|---|
| 1 | burnt orange | 42.9 | light purple | 7.0 | 70 |
| 2 | burnt orange | 57.1 | light purple | 6.7 | 67 |
| 3 | brown-purple | 32.9 | light purple | 7.3 | 73 |
| 4 | brown-purple | 59.7 | dark purple | 7.7 | 77 |
| 5 | light red-brown | 60.8 | dark purple | 8.3 | 83 |
| 6 | light red-brown | 64.2 | dark purple | 6.2 | 62 |
| 7 | light red-brown | 64.1 | dark purple | 6.1 | 61 |
| 8 | light red-brown | 59.8 | dark purple | 8.1 | 81 |

A portion of each catalyst was tested in propylene polymerization for 1 hour at 70° C. with the TEA.EA.-DEAC cocatalyst system as before but the H$_2$ pressure was increased to 25 psi. The results are set forth in Table IIIA.

TABLE IIIA

Propylene Polymerization

| Run No. | H$_2$O/T | Catalyst No. | Wt. mg | Calculated Productivity g/g/hr Total Polymer | Propylene Insoluble Polymer | Bulk Density g/cc | Solubles, Wt % Propylene | Xylene | Total |
|---|---|---|---|---|---|---|---|---|---|
| 1P | 1.0 | 1 | 3.2 | — | 9560 | — | — | 4.5 | 4.5 |
| 2P | 2.0 | 2 | 4.4 | — | 11,000 | >0.195 | — | 2.2 | 2.2 |
| 3P | 3.0 | 3 | 10.0 | 16,400 | 16,300 | 0.356 | 0.6 | 1.6 | 2.2 |
| 4P | 3.5 | 4 | 13.0 | 10,600 | 10,500 | 0.411 | 0.8 | 2.3 | 3.1 |
| 5P | 4.0 | 5 | 10.1 | 11,000 | 10,800 | 0.381 | 1.2 | 3.4 | 4.6 |
| 6P | 4.5 | 6 | 8.5 | 14,000 | 14,000 | 0.378 | 1.0 | 3.8 | 4.8 |
| 7P | 5.0 | 7 | 7.3 | 12,900 | 12,800 | 0.343 | 1.0 | 3.3 | 4.3 |
| 8P | 6.0 | 8 | 2.9 | 4,340 | 4,160 | — | 4.4 | 4.5 | 8.9 |

A dash signifies no determination was made. Inspection of the data show that active propylene polymerization catalysts are made over the entire water:titanium mole ratio range employed. The data do show in run 8P, with a catalyst made with a H$_2$O:Ti mole ratio of 6, that both catalyst productivity and stereospecificity are substantially poorer than any of the other catalysts. This suggests that an excessive amount of water is used in producing the catalyst and it adversely affects the catalytic behavior in propylene polymerization. The remaining catalysts are all active and stereospecific based on the productivity and solubles values. The catalyst used in run 3P, however, combines best productivity and best stereospecificity suggesting that preparing a catalyst with an H₂O:Ti mole ratio of about 3 is near optimum for these catalysts.

EXAMPLE VI

A portion of catalyst samples 1–4 of Example V were tested in individual propylene polymerizations at 70° C. for 1 hour with 25 psi hydrogen as in Example V. However, in this example, the cocatalyst used was a preformed mixture of 4.0 mmoles TEA and 1.1 mmole of EA. DEAC was absent. The results obtained are given in Table IV.

TABLE IV
Propylene Polymerization
TEA-EA Cocatalyst, 4/1 Mole Ratio

| Run No. | Catalyst No. | Wt. mg | Total Polymer | Calculated Productivity g/g/hr Propylene Insoluble Polymer | Solubles, Wt % Propylene | Xylene | Total |
|---|---|---|---|---|---|---|---|
| 9P | 1 | 6.2 | 6,740 | 6,580 | 2.4 | 10.8 | 13.3 |
| 10P | 2 | 15.2 | 6,280 | 6,210 | 1.1 | 8.2 | 9.3 |
| 11P | 3 | 17.5 | 11,600 | 11,500 | 0.5 | 6.5 | 7.0 |
| 12P | 4 | 19.9 | 9,090 | 9,050 | 0.5 | 7.1 | 7.6 |

*Described in Example V.*

The importance of selecting the cocatalyst system to use with the invention catalysts is pointed out in Examples VI–IX wherein the results show a lowering in productivity and/or a higher level of total solubles relative to the 3-component cocatalyst system used in the earlier examples. The beneficial effects of including DEAC with the TEA.EA cocatalyst is apparent, not only from a productivity viewpoint but from a total solubles viewpoint when comparing runs 1P–4P of Example V with runs 9–12 of Example VI.

EXAMPLE VII

A portion of each catalyst sample 1–4 of Example V was tested in propylene polymerization at 70° C. for 1 hour with 25 psi hydrogen as in Example VI. However, in this example, the cocatalyst used was a preformed mixture of 3.0 mmoles TEA and 1.1 mmole of EA. DEAC was absent.

The results obtained are presented in Table V.

TABLE V
Propylene Polymerization
TEA-EA Cocatalyst, 3/1 Mole Ratio

| Run No. | Catalyst No. | Wt. mg | Total Polymer | Calculated Productivity g/g/hr Propylene Insoluble Polymer | Solubles, Wt % Propylene | Xylene | Total |
|---|---|---|---|---|---|---|---|
| 13P | 1 | 11.6 | 2280 | 2190 | 4.2 | 9.1 | 13.3 |
| 14P | 2 | 18.1 | 1820 | 1760 | 3.4 | 7.9 | 11.3 |
| 15P | 3 | 15.8 | 4470 | 4420 | 1.0 | 4.6 | 5.6 |
| 16P | 4 | 22.2 | 4930 | 4900 | 0.7 | 5.3 | 6.0 |

*Described in Example V.*

The results in Table V compared to those in Table IV show that changing the TEA.EA mole ratio from 4:1 to 3:1 decreases both catalyst productivity and stereospecificity.

EXAMPLE VIII

A portion of each catalyst sample 1–4 of Example V was tested in propylene polymerization at 70° C. for 1 hour with 25 psi hydrogen as in Example VII. However, in this example, the cocatalyst used was a preformed mixture of 4.0 mmole TEA and 1 mmole of MPT (methyl p-toluate). DEAC was absent.

The results obtained are set forth in Table VI.

TABLE VI
Propylene Polymerization
TEA-MPT Cocatalyst, 4/1 Mole Ratio

| Run No. | Catalyst[a] No. | Wt. mg | Total Polymer | Calculated Productivity g/g/hr Propylene Insoluble Polymer | Solubles, Wt. Propylene | Xylene | Total |
|---|---|---|---|---|---|---|---|
| 17P | 1 | 4.8 | 6,600 | 6,400 | 3.2 | 8.2 | 11.4 |
| 18P | 2 | 13.7[b] | 16,700 | 16,600 | 0.6 | 7.1 | 7.7 |
| 19P | 3 | 22.4 | 5,270 | 5,230 | 0.7 | 9.1 | 9.8 |
| 20P | 4 | 14.7 | 12,800 | 12,700 | 0.8 | 7.0 | 7.8 |

[a]Described in Example V.
[b]Tube containing catalyst was broken. This value is uncertain but is assumed to represent maximum value.

EXAMPLE IX

A portion of each catalyst sample 1–4 of Example V was tested in propylene polymerization at 70° C. for 1 hour with 25 psi hydrogen as in Example VIII. However, in this example, the cocatalyst used was a preformed mixture of 3.0 mmole TEA and 1.0 mmole of MPT. DEAC was absent.

The results obtained are given in Table VII.

TABLE VII
Propylene Polymerization
TEA-MPT Cocatalyst, 3/1 Mole Ratio

| Run No. | Catalyst No. | Wt. mg | Total Polymer | Propylene Insoluble Polymer | Solubles, Wt % Propylene | Xylene | Total |
|---|---|---|---|---|---|---|---|
| 21P | 1 | 8.3 | 1340 | 1270 | 5.2 | 7.1 | 12.3 |
| 22P | 2 | 13.0 | 5590 | 5520 | 1.2 | 4.4 | 5.6 |
| 23P | 3 | 20.6 | 3970 | 3910 | 1.4 | 4.8 | 6.2 |
| 24P | 4 | 20.0 | 4140 | 4080 | 1.4 | 5.5 | 6.9 |

*Described in Example V.*

The effects of substituting methyl p-toluate (MPT) for EA in the cocatalyst are illustrated in Table VI and VII. Thus the results in Table VI can be compared to those of Table IV, the results in Table VII can be compared to those of Table V and Tables VI and VII can be directly compared.

At a mole ratio of TEA to ester of 4:1, the results in comparing Tables IV and VI suggest that substituting MPT for EA improves productivity of the catalyst while stereospecificity may be improved in some instances and worsened in others.

At a mole ratio of TEA to ester of 3:1, the data in Tables V and VII are inconsistent but do show in run 2P of Table VII relative to run 2P of Table V that MPT is to be preferred over EA. Thus, both productivity and stereospecificity are substantially improved in the presence of MPT in this instance.

In comparing the results in Table VI with those of Table VII, it is clear that a TEA:MPT mole ratio of 4:1 favors decreased solubles.

I claim:
1. A process for the polymerization of alpha olefins comprising contacting said alpha olefins under polymerization conditions with a catalyst prepared by reacting an alkoxytitanium compound, a phenol, and a small quantity of water in a hydrocarbon liquid, then reacting the resulting solution with a magnesium dihalide having less than 1.5 moles of water per mole of magnesium dihalide to form a first catalyst component solution, then reacting that solution with an organoaluminum halide to form a solid product, and then reacting said solid product with a halogenating agent comprising a titanium halide, wherein the amount of water employed in forming said first catalyst component solution is such that the catalyst is more active than if no water were employed.

2. A process according to claim 1 wherein said magnesium dihalide has less than 1 mole of water per mole of magnesium dihalide.

3. A process according to claim 2 wherein said magnesium dihalide comprises magnesium dichloride, said alkoxytitanium compound comprises a compound of the formula $Ti(OR)_4$ wherein each R is individually selected from alkyl groups containing 1 to 20 carbon atoms, and wherein said organoaluminum halide comprises ethyl aluminum sesquichloride.

4. A process according to claim 3 wherein said halogenating agent comprises a mixture of $TiCl_4$, $HSiCl_3$, and $SiCl_4$.

5. A process according to claim 4 wherein the combined volumes of the $HSiCl_4$ and $SiCl_4$ in the halogenating agent is equal to the volume of $TiCl_4$.

6. A process according to claim 5 wherein said magnesium dihalide has less than 0.1 mole of water associated with each mole of magnesium dihalide and the molar ratio of water added in making said first catalyst component solution to the titanium compound is in the range of 1/1 to 5/1.

7. A process according to claim 6 wherein said magnesium dihalide has less than 0.05 mole of water associated with each mole of magnesium dihalide.

8. A process according to claim 7 wherein said phenol is selected from the group consisting of 4-phenyl phenol, p-cresol, phenol and p-sec-butylphenol.

9. A process according to claim 8 wherein ethylbenzoate is also employed in making said first catalyst component solution.

10. A process according to claim 9 wherein said phenol is 4-phenyl phenol.

11. A process according to claim 10 wherein said alkoxytitanium compound comprises titanium tetra-n-butoxide.

12. A process according to claim 11 wherein polypropylene is produced.

13. A process according to claim 12 employing a cocatalyst consisting essentially of triethyl aluminum, ethyl benzoate, and diethyl aluminum chloride, in a mole ratio of about 2/1/2, respectively.

14. A process according to claim 12 employing a cocatalyst consisting essentially of triethyl aluminum and methyl-para-toluate, in a mole ratio in the range of 3/1 to 5/1.

* * * * *